(12) United States Patent
Ellsworth

(10) Patent No.: US 9,366,863 B2
(45) Date of Patent: Jun. 14, 2016

(54) TWO SECTION HEAD MOUNTED DISPLAY

(71) Applicant: CastAR, Inc., Palo Alto, CA (US)

(72) Inventor: Jeri J. Ellsworth, Kirkland, WA (US)

(73) Assignee: CastAR, Inc., Palo Alto, CA (US)

( * ) Notice: Subject to any disclaimer, the term of this patent is extended or adjusted under 35 U.S.C. 154(b) by 105 days.

(21) Appl. No.: 14/272,054

(22) Filed: May 7, 2014

(65) Prior Publication Data

US 2015/0323797 A1 Nov. 12, 2015

(51) Int. Cl.
*G02B 27/01* (2006.01)
*G02C 11/00* (2006.01)

(52) U.S. Cl.
CPC ............ *G02B 27/01* (2013.01); *G02B 27/0176* (2013.01); *G02B 2027/0167* (2013.01); *G02B 2027/0178* (2013.01); *G02C 11/10* (2013.01)

(58) Field of Classification Search
CPC .................... G02B 27/0176; G02B 27/0178
See application file for complete search history.

(56) References Cited

U.S. PATENT DOCUMENTS

| 4,867,551 A * | 9/1989 | Perera ................ G02B 27/0176 351/158 |
| 6,480,174 B1 * | 11/2002 | Kaufmann ......... G02B 27/0172 345/7 |

* cited by examiner

*Primary Examiner* — Joseph P Martinez
(74) *Attorney, Agent, or Firm* — Beyer Law Group LLP

(57) ABSTRACT

A system is presented in which a head mounted display is realized in two sections such that a section that comes in contact with the human face may be cleaned and sanitized independently of a section with sensitive electronic and optical components.

5 Claims, 2 Drawing Sheets

TWO SECTION HEAD MOUNTED DISPLAY

FIELD OF THE INVENTION

This invention relates to head mounted displays for augmented and virtual reality applications.

SUMMARY

A head mounted display system is presented having two sections to facilitate sanitation and user size matching.

DETAILED DESCRIPTION

Head mounted displays for the applications of augmented reality and virtual reality have been described in prior art such as by Miller in U.S. Pat. No. 8,467,133. One common problem with many of the described head mounted systems is that cleaning and sanitation can be difficult because of the sensitive electronics and optics contained in these systems. This problem is particularly troublesome in situations where a public performance, such as in a theater, requires clean surfaces to be in contact with the faces of attendees from the public. The current invention solves this problem by dividing the system into two sections where the section that contacts the face is easily cleaned and sanitized when disconnected from the section holding the sensitive electronics and optics.

Figure 1:
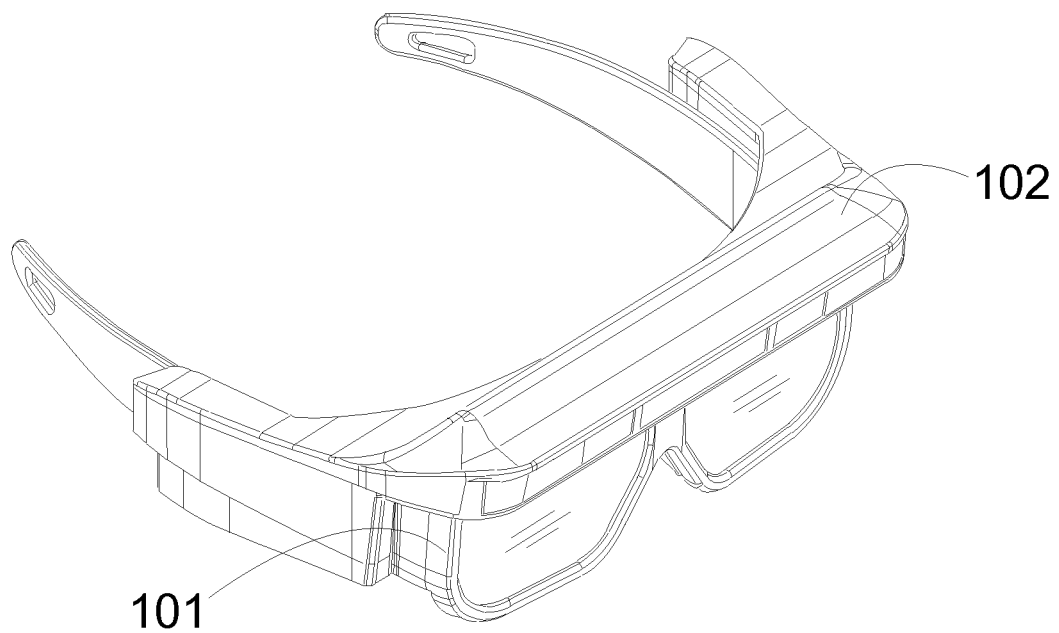
FIG. 1. —A head mounted display system.

FIG. 1 shows an embodiment of a projected augmented reality head mounted display system comprising sections 101 and 102. In this embodiment section 101 comprises a frame holding viewing lenses that fits the face of the user, and section 102 comprises compartments that hold projection devices and head tracking cameras that are used to project images out to a retroreflective screen (not shown) which are then reflected back through the viewing lenses. Although projected augmented reality is shown in this embodiment it should be understood that the invention also applies to closed-in augmented and virtual reality systems, so long as they can be divided into two sections where only one section comes in contact with the human face.

Figure 2:
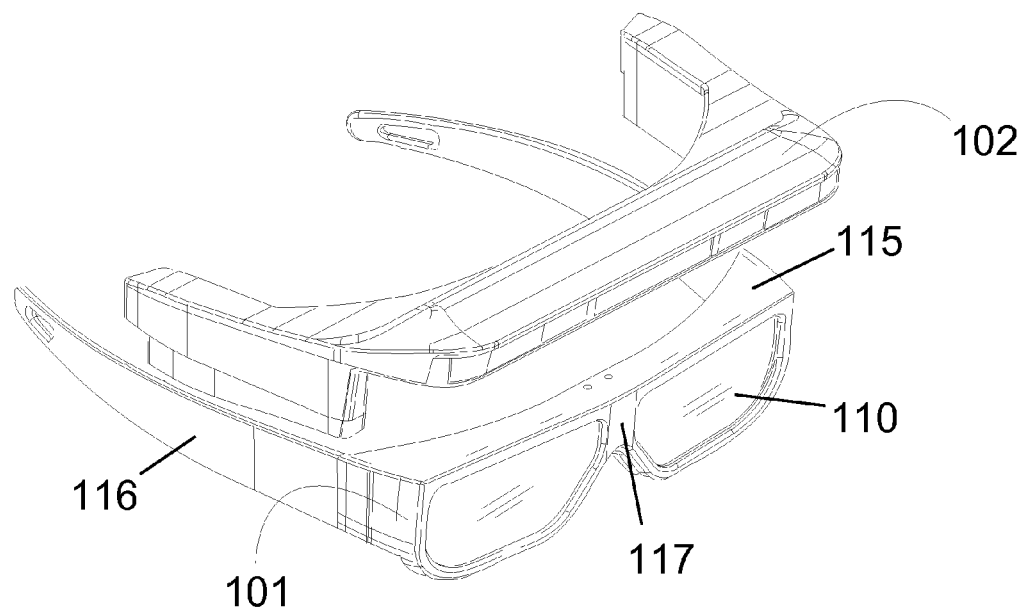
FIG. 2. —The system of FIG. 1 shown separated into two sections.

In the illustrated embodiment, the section 101 includes lenses 110 and a frame 115 having temples 116 and a bridge 117 as best illustrated in FIG. 2.

FIG. 2 shows the system of FIG. 1 wherein sections 101 and 102 have been disconnected such that section 101 may be sent to cleaning and sanitation means without damage to section 102. A further advantage to the invention is that the frames in section 101 may be chosen from a plurality of sizes and shapes to fit the faces of different users. This reduces the complexity of requiring mechanical means be built into a single common frame to adjust to different size faces. Nothing here limits the washable section 101 from comprising further detachable or substitutable pieces, such as custom nose pieces.

An illustrative embodiment has been described by way of example herein. Those skilled in the art will understand, however, that change and modifications may be made to this embodiment without departing from the true scope and spirit of the elements, products, and methods to which the embodiment is directed, which is defined by my claims.

I claim:

1. A head mounted augmented reality display system separable into two sections including:
   a first section comprising glasses frames, goggles or other eyewear that hold viewing lenses through which a user can see, the first section including a frame that holds the viewing lenses and a pair of temples arranged to rest on the user's ears; and
   a second section comprising head tracking cameras and electronic and optical components for the generation and projection of images away from the head mounted display system, wherein projected images that reflect off of a retroreflective surface located external to the augmented reality display system may be seen by the user after passing through the viewing lenses to form an augmented reality image; and
   wherein said first section may be separated from said second section and cleaned and sanitized independently with respect to said second section.

2. The system of claim 1 in which the first section does not include any electronic components.

3. The system of claim 1 having a choice of a plurality of sizes and shapes for said first section so as to facilitate fitting to different size and shape human faces.

4. A method of cleaning and sanitizing a head mounted augmented reality display system comprising:
   providing a head mounted augmented reality display system that is separable into two sections including a first section comprising glasses frames, goggles or other eyewear that hold viewing lenses through which a user can see and a pair of temples arranged to rest on the user's ears, and a second section comprising head tracking cameras and electronic and optical components for the generation and projection of images away from the head mounted display system, wherein projected images that reflect off of a retroreflective surface located external to the augmented reality display system may be seen by the user after passing through the viewing lenses to form an augmented reality image; and wherein said first section may be separated from said second section;
   disconnecting said first section from said second section;
   washing or sanitizing said first section independently from the second section after the first section is disconnected from said second section;
   reconnecting said first and second sections after washing or sanitizing said first section.

5. The method of claim 4 wherein first section does not include any electronic components.

* * * * *